April 30, 1968 J. G. READ 3,380,170
GAUGE
Filed Oct. 22, 1965 3 Sheets-Sheet 2
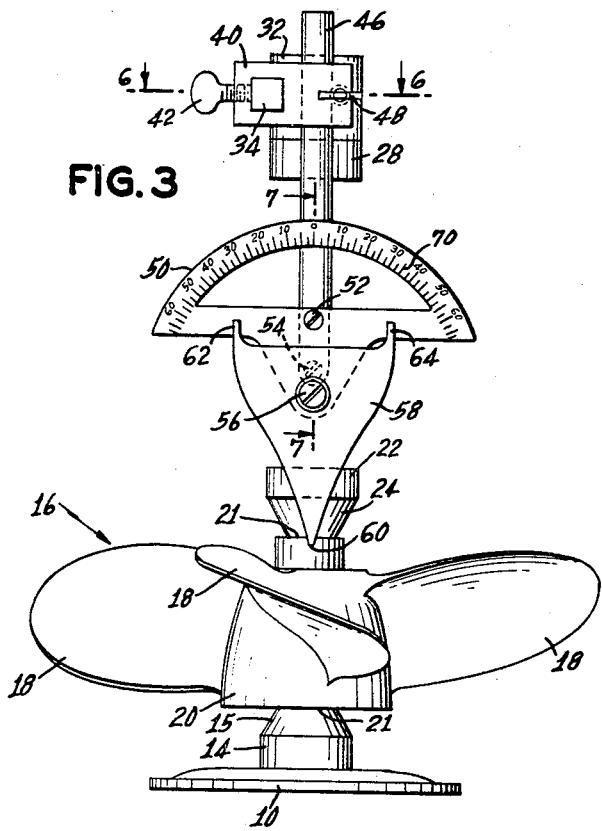
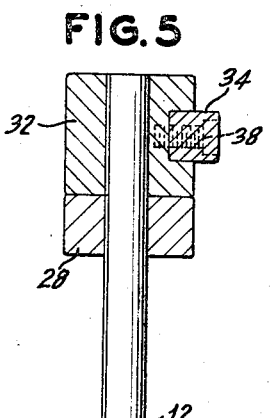
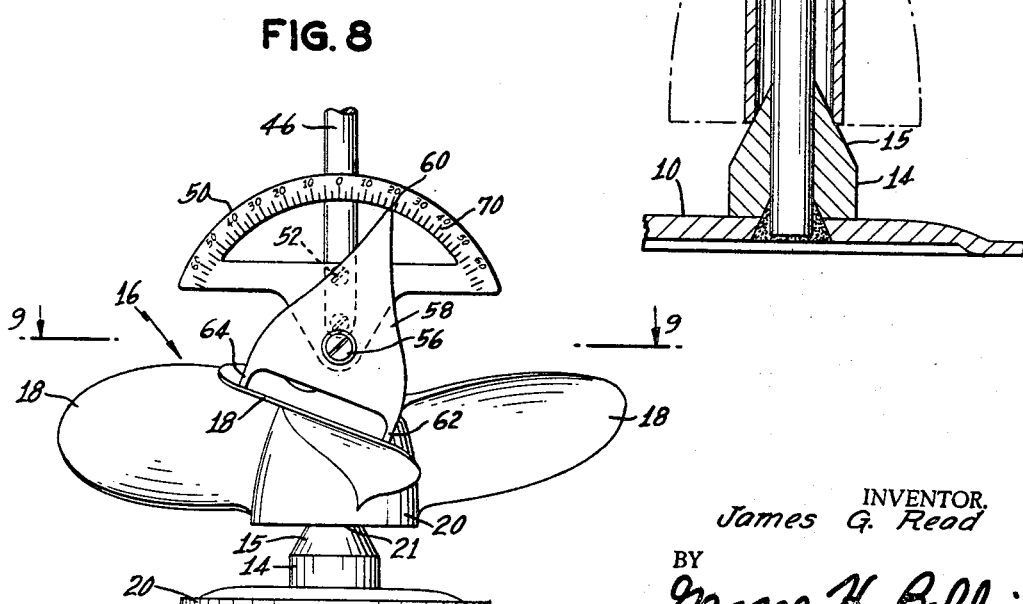
INVENTOR.
James G. Read
BY
George H. Baldwin
ATTORNEY April 30, 1968  J. G. READ  3,380,170
GAUGE Filed Oct. 22, 1965  3 Sheets-Sheet 3

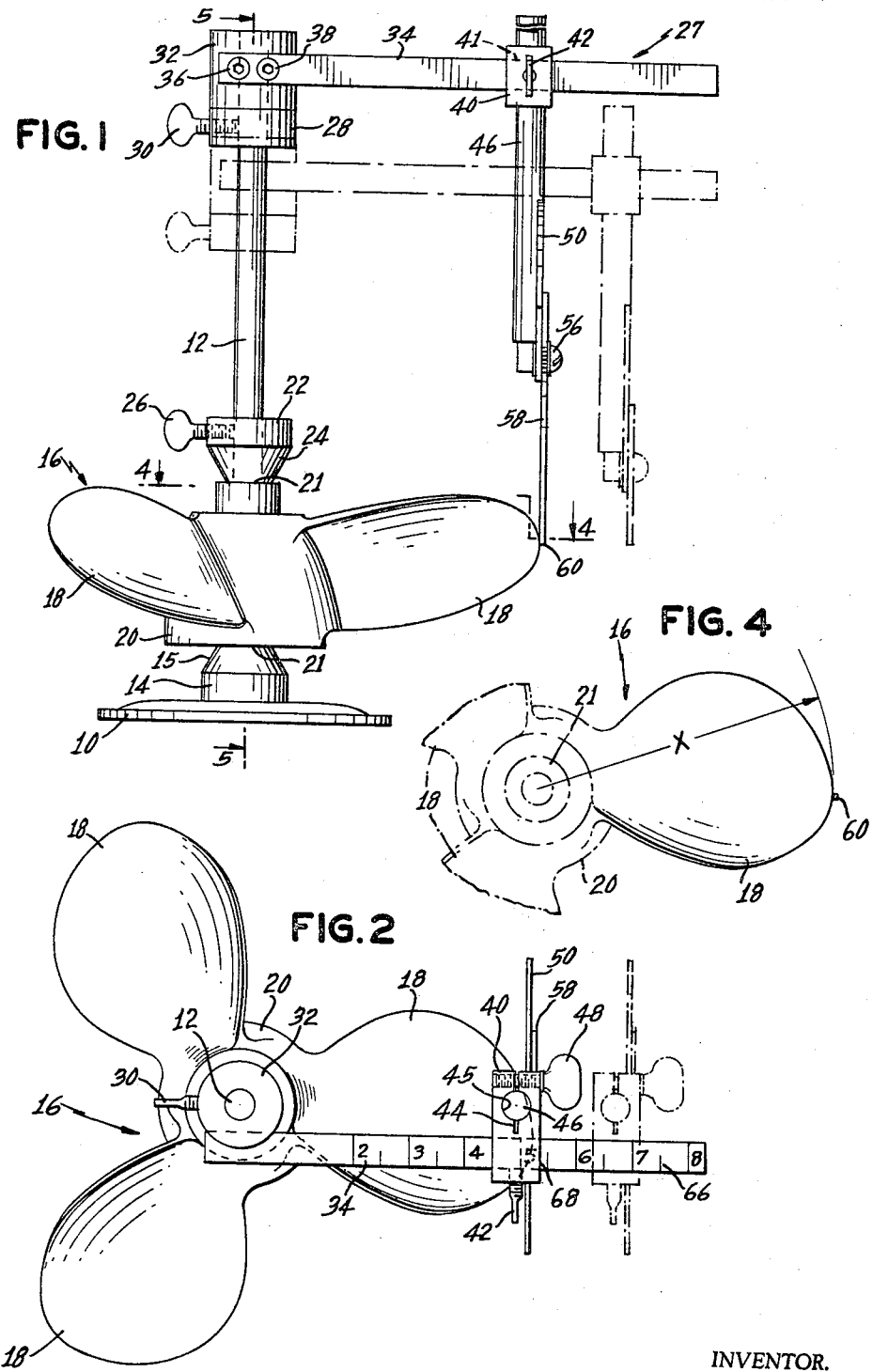

INVENTOR.
James G. Read
BY
George H. Baldwin
ATTORNEY

United States Patent Office 3,380,170
Patented Apr. 30, 1968

3,380,170
GAUGE
James G. Read, 14719 Plumosa Drive,
Jacksonville Beach, Fla. 32050
Filed Oct. 22, 1965, Ser. No. 502,246
8 Claims. (Cl. 33—174)

ABSTRACT OF THE DISCLOSURE

A propeller pitch and radius gauge including a base member, a first vertically upstanding cylindrical shaft mounted on the base member, a first conical hub mounted on the base member and mounted to the first shaft and a second conical hub having a passage therethrough slidably and adjustably mounted on the first shaft with the first shaft passing through the passageway thereof, the first and second hubs being adapted and arranged to engage a propeller when the propeller is mounted between the hubs with the first shaft passing through the bore of the propeller. The gauge further includes a pitch and radius measuring mechanism adjustably mounted on the upper portion of the first shaft above the second hub. This measuring mechanism includes an adjustable member slidably mounted on the upper portion of the first shaft, an arm connected to the adjustable member and extending outwardly therefrom generally perpendicular to the first upstanding shaft, with the arm being provided with dimension indicia to measure the radius of a propeller when the measuring mechanism is positioned adjacent the circumference of a propeller to be measured, a slidable member adjustably mounted on the arm and a second vertically upstanding shaft generally parallel to the first shaft adjustably mounted to the slidable member. The measuring mechanism also includes an arcuate scale element mounted to the second shaft adjacent its lower end which has indicia to determine the pitch of a propeller blade when the measuring mechanism is positioned adjacent and across the surface of a propeller blade to be measured, and further includes a rotatable indicator adjacent the lower portion of the scale element. The indicator has a single pointer on one of its ends for use in measuring the radius of a propeller and a pair of spaced pointers on its end opposite to the single pointer for use in measuring the pitch of a propeller blade with the single pointer indicating the pitch on the scale element.

---

This invention pertains to gauges; more particularly, the subject invention relates to an instrument or gauge used in determining the pitch and diameter of a propeller and in comparing one propeller to another or comparing the propeller blades of the same propeller.

Today there are in existence a great many devices which employ a motor driven propeller. Outstanding examples of fields in which these type devices are found, are the aviation field and the marine field, wherein a great number and variety of propellers may be found. Additionally propellers are often found in such devices as air fans and lawn mowers of the rotary type. Oftentimes during the operation of these motorized and propeller containing devices the rapidly spinning propeller will come into contact with a hard object. This is particularly true in the marine field, where the spinning propeller may hit a submerged object, such as a tree trunk, rock or the like, or the same may come into contact with large objects floating in the water. These collisions can and frequently do cause damage to the propeller such that repair or replacement of the same is necessitated; the damage usually amounting to a bent or broken propeller blade or blades.

In order to adequately check, repair or replace a great variety of different size and shape propellers it is necessary to accurately determine the pitch of the propeller blades and the propeller's diameter for any one given propeller which it may be desired to check, repair or replace. Therefore to accurately, readily and consistently measure and determine these dimensions of the propeller to be checked, repaired or replaced, means in the form of a portable, light-weight, adjustable and easily and readily operable device or gauge is needed. A gauge of this nature would also find wide use and acceptance in the manufacture of propellers where it is desired to control and maintain the quality of the finished product, and in the sellling of propellers where it is desired to check the propeller before the finalization of the sale.

Therefore it is a general object of this invention to provide an improved gauge for determining the pitch of a propeller blade and the radius of the same.

Another object of the invention is to provide an improved propeller pitch and diameter gauge which is portable, lightweight, and easily and readily operable.

A further object of the subject invention is to provide an instrument for comparing one propeller to another, or comparing the blades of the same propeller.

Still another object of this invention is to provide an improved instrument for checking and comparing the relationship of the bore of a propeller to the plane of the propeller blades.

Still a further object of the subject invention is to provide an improved instrument with which one can easily and readily duplicate a given propeller.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is an elevational view of the gauge or instrument of this invention with a propeller in place thereon; the gauge being positioned to obtain the propeller radius;

FIG. 2 is a top plan view of the propeller pitch and diameter gauge of this invention;

FIG. 3 is a right side elevational view of the device as shown in FIG. 1 with the indicator in a slightly raised position from that of FIG. 1;

FIG. 4 is a partial cross-sectional view through the device with a propeller mounted thereon taken along line 4—4 of FIG. 1;

FIG. 5 is a cross-sectional view through the device obtained along the line 5—5 of FIG. 1;

FIG. 8 is a partial elevational view of the device with a propeller in position thereon wherein the pitch of one of the propeller blades is being determined.

Figure 9:
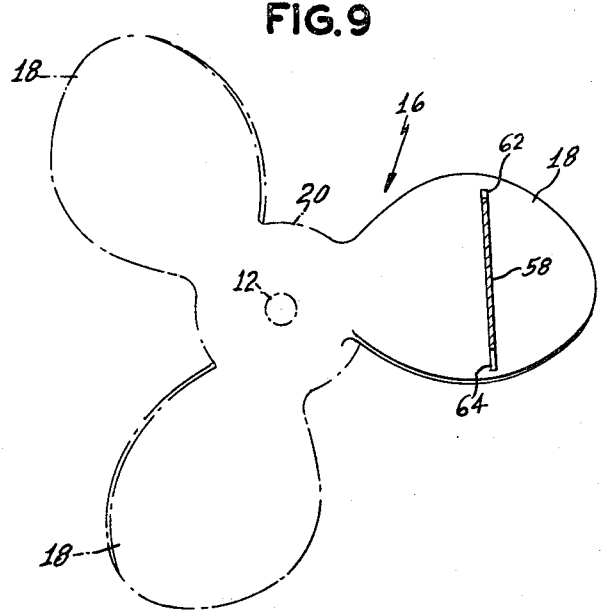
FIG. 9 is a cross-sectional view through the gauge with a propeller mounted thereon taken along line 9—9 of FIG. 8.
Figure 7:
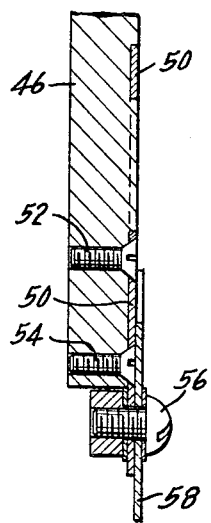
FIG. 7 is another partial cross-sectional view through the gauge taken on line 7—7 of FIG. 3.

Referring now specifically to the drawings, wherein like reference numerals indicate like parts through the several views thereof; and in particularly to FIG. 1 wherein the propeller gauge of this invention is seen to comprise a base 10 through the center of which is mounted and securely connected an upstanding shaft or circular support member 12 on which the propeller to be checked and the indicating means is mounted. Attached to the base 10 and the lower portion of the circular supporting shaft 12 is a hub 14 the upper portion 15 of which is beveled such that this hub may accommodate a great variety of propellers having different size bores. A typical propeller 16 having propeller blades 18 and hub 20 is positioned on hub member 14 such that the lower end of the propeller's bore 21 rests on the beveled portion 15 thereof. To further mount and secure the propeller 16 on the gauge's supporting shaft 12 another hub 22 having a beveled lower portion 24 and similar to hub 14 is provided. The beveled sides 24 of this hub 22 are made to extend downward into the propeller's bore 21 a sufficient distance such that there is essentially no play between the propeller and these two hubs 14 and 22, but yet allowing the propeller to rotate freely about the shaft 12. Once this adjustment is made thumb screw 26 of hub 22 is tightened, securing this hub in place on the vertical supporting shaft 12, one side of which is slightly flattened to provide a seat for the inner ends of the thumb screws. The propeller is now in place on the gauge with its center line passing through the center of upright supporting shaft 12, and free to rotate thereabout, see FIG. 5.

Figure 6:
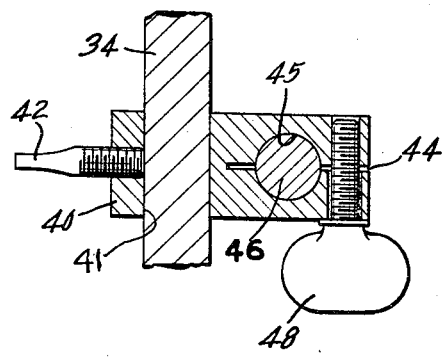
FIG. 6 is a partial cross sectional view through the device taken on line 6—6 of FIG. 3.

Once the desired propeller has been placed on the gauge, as above described and as shown in FIGS. 1 and 5, the upper part or indicator portion 27 of the gauge is next placed on the supporting shaft 12. To accomplish this a smaller upper hub 28 having a flat top and bottom is first placed on the supporting shaft 12 over its upper end. The hub 28 is adjustable up and down the shaft 12 (see FIG. 1) and may be secured thereto by the means of thumb screw 30 at any desired position. After securing hub 28 in place by screw 30 near the upper end of shaft 12 the indicating portion or measuring mechanism 27 of this gauge is placed over the top of shaft 12 and is made to rest on the upper surface of secured hub 28. The indicating portion or measuring mechanism 27 is supported by and comprises a larger upper hub 32, provided with a circular opening through its center such that it may readily and easily be moved upward and downward on shaft 12 and rotate freely thereabout, but small enough in diameter such that there is very little play between hub 32 and shaft 12. Connected to this large hub 32 and at right angles to the center line thereof is a square supporting arm 34, the attachment being made by a pair of screws 36 and 38. Adjustably mounted on supporting arm 34 is a metal bracket or block 40 having a square opening 41 therethrough adjacent one of its ends such that it may freely slide along the supporting arm 34 (see FIGS. 1 and 2) until tightened in a desired position by thumb screw 42. Adjacent the other end of this metal block 40 is a vertical slot 44 and a circular opening 45 therethrough (see FIG. 6). Extending through this circular opening 45 is a second circular rod 46 which is adjustably slidable through this hole and may be clamped in position by tightening the thumb screw 48, which action pinches the sides of block 40 around the slidable shaft 46. Shaft 46 is perpendicular to supporting arm 34 so that the shaft 46 is parallel to the supporting shaft 12 and the center line of a propeller when the same is in place on the shaft 12. Attached to the lower end of slidable shaft 46 is a protractor type scale 50 which is mounted to the shaft 46 by means of metal screws 52 and 54. Connected by means of a bolt, nut and washers 56 to the lower end of the protractor type scale 50 is a pointer or indicator 58. This pointer or indicator (FIG. 3) is completely rotatable about the bolt 56, and has a single point at one end 60 used in measuring propeller diameters and a pair of points 62 and 64 on the opposite side thereof used in determining the pitch of a propeller.

The square horizontal supporting arm or bar 34 is subdivided and marked on its top side as at 66 with inch markings (depicted in FIG. 2) for the easy and ready determination of the radius of any given propeller. These markings are so positioned on the arm 34 that one can directly read the radius of the propeller being checked by reading the scale adjacent the outer edge 68 of the block 40, this reading giving the distance in inches from the center line of supporting shaft 12 or the center line of the propeller mounted thereon to the tip 60 of the indicator which is positioned adjacent the outer edge of one of the propeller blades 18 as can be seen in FIGS. 1 and 2.

The protractor type scale 50 mounted to the vertical slidable shaft 46 is also provided with graduations, as at 70 such that the pitch of any given propeller blade may be readily determined. The divisions of protractor type scale 50 of FIG. 3 happen to be in degrees such that the reading obtained therefrom in determining the propeller pitch as in FIG. 8 would have to be converted via a table or chart to the actual blade pitch. Although the scale as depicted in FIG. 3 is in degrees, it is contemplated by this invention to provide a scale from which one could readily read the propeller pitch directly.

To obtain the radius or diameter of any given propeller the propeller will first be placed on the instrument as depicted in FIGS. 1, 2 and 5. The gauge is first disassembled and the propeller whose radius and diameter is to be measured or checked is placed on the fixed hub 14 such that the lower end of the propeller's bore 21 rests on the beveled portion 15 of this hub 14. Next the upper propeller holding hub 22 is placed on the shaft 12 and tightened in place by use of thumb screw 26 such that the upper end of the propeller bore 21 is in contact with the beveled portion 24 of this upper hub 22; the propeller being free to rotate about the supporting shaft 12 with no play between the propeller 16 and the two hubs 14 and 22. The small upper hub 28 having flat upper and lower surfaces is placed on the supporting shaft 12 and tightened thereto by thumb screw 30. Thereafter large upper hub 32 carrying supporting arm 34 and the indicating mechanism 27 is placed over the shaft 12 and is made to rest on the flat upper surface of small upper hub 28. The indicator point 60 of the gauge is rotated about bolt 56 until it points vertically downward as depicted in FIG. 1. This point 60 is next positioned adjacent the outermost tip of one of the propeller blades 18 by making the proper adjustments of hub 28 upward and downward by the use of thumb screw 30, metal block 40 inward and outward along the supporting arm 34 by thumb screw 42, and movable shaft 46 upward and downward within the metal block 40 by thumb screw 48. Once the indicator point 60 is positioned as shown in FIGS. 1 and 2 and tightened in place the scale on the top of the supporting arm 34 is read adjacent the outermost edge 68 of metal block 40 to indicate the radius of this particular propeller blade, as for an example, X of FIG. 4. This radius may then be compared with the radii of the other propeller blades by rotating the propeller until other of its blades 18 come to rest with their outermost point adjacent the indicator tip 60 which has been secured in place. It is possible by this means then to determine the accuracy of this particular propeller being check and/or to ascertain whether the propeller is within the proper specifications and tolerances as to its diameter. The radius so obtained can also be used to compare other like propellers with this given propeller. The diameter of this propeller is easily obtained by making a simple calculation, that being the doubling of the radius measurement obtained.

The relationship of the bore of the propeller may be compared to the plane of the propeller blades as in FIG. 3; the relationship desired being that the bore of the propeller wheel be perpendicular to the plane of the propeller blades. With the indicator point 60 pointing vertically downward the movable vertical shaft 46 is adjusted upward or downward and the metal block 40 is moved inward or outward along square supporting arm 34 until the indicator point 60 is directly over and adjacent the uppermost point on one of the propeller blades of the propeller being checked. To determine the perpendicularity of the blades to the bore of the propeller wheel the propeller is rotated until the highest most point of the other propeller blades are in turn positioned adjacent and directly beneath the indicator point 60. Should there be any discrepancies, in the height above or distance below the indicator point 60, the highest most point on the other propeller blades comes to in checking them, it is easily determined which direction and to what extent these other blades are out of perpendicular with the bore, such that they may be adjusted and corrected to all lie in the same plane which is perpendicular to the propeller bore.

With the instrument or gauge of this invention, it is also possible to accurately check and compare any given point on one blade of a propeller with the same point on the other blades of the propeller. To do this the blades of the propeller are first marked by cross-sectioning with a pencil, chalk or the like, such that the surface of each propeller blade has the identical crossing lines forming small squares thereon. Then with the propeller mounted on and the device arranged as in FIG. 3 the point to be checked within the cross-sectional framework of one blade is chosen and the indicating point 60 is lowered to this selected point and secured in position by the locking thumb screw. Next the operator will raise the large upper hub 32 and connected supporting arm 34 upward on the suporting shaft 12 such that the indicator point 60 will clear the blades of the propeller. The propeller is then rotated such that another blade comes into position under the indicator point 60; the operator lowering upper large hub 32 and connected supporting arm 34 to rest on the upper surface of small upper hub 28 lowering indicator point 60 into position to check the selected point on this new propeller blade. Should the indicator point 60 fall within a different cross-sectional square or on a different point within the same square, the operator will know that the selected point being checked does not accurately compare with the position of the same point on the previous blade, and can determine by what amount and what direction the point needs to be corrected. The operator will then proceed in a like manner to check the selected point on the remaining propeller blades not previously checked. By such means selected points over the entire surface of the propeller blades may be compared to obtain pinpoint accuracy of the blades of the propeller, which is often desired particularly in marine propellers used in motor boat racing.

The pitch of any propeller blade may be determined by this device as depicted in FIGS. 8 and 9. To obtain the propeller blade pitch, the propeller is mounted on the instrument on the upright vertical shaft 12 as previously described, and the indicator 58 is inverted such that both of the points 62 and 64 extend in a downward direction. The instrument operator will then bring one of the propeller blades directly under the indicator 58 and the same will be lowered and adjusted using thumb screws 30, 42, and 48 as necessary, such that it assumes a position across the flat section of the propeller blade (all propeller blades having one flat section) similar to that as shown in FIGS. 8 and 9, such that the two indicating points 62 and 64 rest on the propeller blade. The operator can then read the graduations 70 on scale 50 adjacent the indicating point 60 (see FIG. 8) to determine the angle as measured from the vertical of the pitch of this propeller blade, or if the proper scale were provided, read the propeller pitch directly. Having once obtained the degree reading for this propeller blade the operator may consult a chart or table to convert the degree reading to the actual pitch of the propeller blade. The determined propeller pitch may then be used to compare the pitch of this blade with the pitch of other propellers or to check if this particular propeller is within its stated specifications and tolerances as to pitch. Should it be desired to compare the pitch of this particular blade with the pitch of other blades of this propeller the operator will leave the indicator in position with the points 62 and 64 resting on the propeller blade as depicted in FIG. 8; and then raise the hub 32 and supporting arm 34, rotate the propeller until another blade thereof comes into position underneath the indicator 58, then lower the hub 32 and connected supporting arm 34 to rest on the upper secured hub 28. The operator can then compare the pitch of the new blade with the pitch previously determined for the adjacent propeller blade, and so on until all blades of the propeller have been compared.

While the embodiment depicted and described of the propeller pitch and diameter gauge of this invention is particularly suited to accommodate relatively small marine propellers, the instrument of this invention is easily and readily adapted to accommodate other marine propellers, aviation propellers, propellers of air fans, and the propeller-like blades of rotary-type lawn mowers, and is useful in connection with all other devices wherein an axial type propeller is employed.

As has been brought out above the instrument or gauge of this invention has a number of uses. It may be used to determine the pitch of any given propeller blade, or it may be used to determine the radius and diameter of a given propeller. It may also be used as a device to compare the radius and pitch of blades within the same propeller, and may be used to compare propeller blades of the same propeller on a point to point basis. Additionally the device may be used to determine whether or not the bore of a particular propeller is perpendicular to the plane of the blades of that propeller, and whether or not all blades of a propeller lie in the same plane. The gauge of this invention may be used as a device to compare one propeller to another propeller, or one which is stated to be identical therewith. The instrument may be used to determine the accuracy of any given propeller, and to determine whether or not the propeller is within its stated specifications and tolerances of pitch and diameter. The device is also useful in the duplicating of one propeller, and in the manufacture of propellers to maintain quality control thereof.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A propeller pitch and radius gauge comprising in combination a base member, a first upstanding cylindrical shaft mounted on said base member, a first conical hub mounted upright on said base member and coaxial with said first shaft, a second conical hub having a passage therethrough slidably and adjustably mounted in inverted relation on said first shaft with said first shaft passing through said passage, said first and second hubs being adapted and arranged to engage a propeller therebetween with said first shaft passing through the bore of the propeller, an adjustable member mounted on the upper portion of said first shaft above said second hub for supporting a pitch and radius measuring mechanism, said pitch and radius measuring mechanism including a rotatable member slidable on said first shaft and supported thereon by said adjustable member, an arm connected to said rotatable member and extending outward therefrom generally perpendicular to said first upstanding shaft, said arm being provided with dimension indicia to measure the radius of a propeller, a slidable member adjustably mounted on said arm, a second upstanding shaft generally parallel to said first shaft adjustably mounted to said slidable member, an arcuate scale element mounted to said second shaft adjacent its lower end and having indicia to determine the pitch of a propeller blade, and a rotatable indicator adjacent the lower portion of said scale element, said indicator having a single pointer on one end thereof for use in measuring the radius of a propeller and a pair of spaced pointers opposite to said single pointer for use in measuring the pitch of a propeller blade with said single pointer indicating the pitch on said scale element.

2. A propeller pitch gauge comprising in combination a base member, a first upstanding cylindrical shaft mounted on said base member, a first conical hub mounted upright on said base member and coaxial with said first shaft, a second conical hub having a passage therethrough slidably and adjustably mounted in inverted relation on said first shaft with said first shaft passing through said passage, said first and second hubs being adapted and arranged to engage a propeller therebetween with said first shaft passing through the bore of the propeller, an adjustable first member mounted on the upper portion of said first shaft above said second hub for supporting a pitch measuring mechanism, said pitch measuring mechanism including a rotatable member slidable on said first shaft and supported thereon by said adjustable member, an arm connected to said rotatable member and extending outward therefrom generally perpendicular to said first upstanding shaft, a slidable member adjustably mounted on said arm, a second upstanding shaft generally parallel to said first shaft adjustably mounted to said slidable member, an arcuate scale mounted to said second shaft adjacent its lower end and having indicia to determine the pitch of a propeller blade, and a rotatable indicator adjacent the lower portion of said scale element, said indicator having a single pointer on one end thereof and a pair of spaced pointers opposite to said single pointer for use in determining the pitch of the propeller blade with said single pointer indicating the pitch on said scale element.

3. A propeller pitch and radius gauge comprising in combination a base member, a first upstanding shaft having a longitudinal axis mounted on said base member, a first conical hub having a longitudinal axis mounted upright on said base member and coaxial with said first shaft, a second conical hub having a longitudinal axis and a passage therethrough slidably and adjustably mounted in inverted relation on said first shaft with said first shaft passing through said passage, the longitudinal axes of said first shaft and said first and second hubs being in alignment, said first and second hubs being adapted and arranged to engage a propeller therebetween for rotation thereof with said first shaft passing through the bore of the propeller, and a pitch and radius measuring mechanism adjustably mounted on the upper portion of said first shaft above said second hub, said measuring mechanism including an adjustable member slidably mounted on the upper portion of said first shaft, an arm connected to said adjustable member and extending outward therefrom generally perpendicular to said first upstanding shaft, said arm being provided with dimension indicia to measure the radius of a propeller, a slidable member adjustably mounted on said arm, a second upstanding shaft generally parallel to said first shaft adjustably mounted to said slidable member, an arcuate scale element mounted to said second shaft adjacent its lower end and having indicia to determine the pitch of a propeller blade, and an indicator rotatably mounted to said scale element adjacent its lower portion, said indicator having a single pointer on one end thereof for use in measuring the radius of a propeller and a pair of spaced pointers opposite to said single pointer for use in measuring the pitch of a propeller blade with said single pointer indicating the pitch on said scale element.

4. A propeller pitch and radius gauge comprising in combination a base member, a first upstanding shaft mounted on said base member, adjustable means for positioning a propeller on said gauge with said first shaft passing through the bore of the propeller, and a pitch and radius measuring mechanism slidably and adjustably mountable on the upper portion of said first shaft, said measuring mechanism including an adjustable member slidably mountable on the upper portion of said first shaft, an arm connected to said adjustable member and extending outward therefrom generally perpendicular to said first upstanding shaft, said arm being provided with dimension indicia to measure the radius of a propeller, a slidable member adjustably mounted on said arm, a second upstanding shaft generally parallel to said first shaft adjustably mounted to said slidable member, an arcuate scale element mounted to said second shaft adjacent its lower end having indicia to determine the pitch of a propeller blade, and a rotatable indicator adjacent the lower portion of said scale element, said indicator having a single pointer on one end thereof for use in measuring the radius of a propeller and a pair of spaced pointers opposite to said single pointer for use in measuring the pitch of a propeller blade with said single pointer indicating the pitch on said scale element.

5. An instrument for determining the pitch of a propeller comprising in combination a base member, a first upstanding shaft mounted on said base member, a pair of conical hubs coaxial with said first shaft and adapted and arranged to rotatably mount and engage a propeller with hubs extending into the bore of the propeller, mounting means for adjustably spacing said pair of hubs, an adjustable member mounted on the upper portion of said shaft, and a pitch measuring mechanism slidably mountable on the upper portion of said first shaft and supported thereon by said adjustable member, said measuring mechanism including a rotatable member slidable on said first shaft and supported thereon by said adjustable member, an arm connected to said rotatable member and extending outward therefrom generally perpendicular to said first upstanding shaft, a slidable member adjustably mounted on said arm, a second vertically upstanding shaft generally parallel to said first shaft adjustably mounted to said slidable member, an arcuate scale element mounted to said second shaft adjacent its lower end and having indicia to determine the pitch of a propeller blade, and a rotatable indicator adjacent the lower portion of said scale element, said indicator having a single pointer on one end thereof and a pair of spaced pointers opposite to said single pointer for use in measuring the pitch of a propeller blade with said single pointer indicating the pitch on said scale element.

6. In an instrument for determining the pitch and radius of a propeller having a base member, a vertically upstanding shaft mounted on said base member, adjustable means mounted to said shaft for rotatably mounting a propeller in position to be measured, and a pitch and radius measuring mechanism including indicating means to measure the radius of a propeller when positioned adjacent the circumference of a propeller to be measured and to determine the pitch of a propeller blade when positioned adjacent and across the surface of a propeller blade to be measured, and mounting means for slidably and adjustably mounting said indicating means on said upstanding shaft above said adjustable means, the improvement wherein said indicating means includes a scale element having indicia to determine the pitch of a propeller blade, said indicating means further including a rotatable indicator adjacent said scale element, said indicator having a single pointer on one end thereof for use in measuring the radius of a propeller and a pair of spaced pointers opposite to said single pointer for use in measuring the pitch of a propeller blade with said single pointer indicating the pitch on said scale element.

7. An instrument for determining the pitch and radius of a propeller comprising in combination a base member, a first upstanding shaft mounted on said base member, adjustable means for positioning a propeller on said instrument with said first shaft passing through the bore of the propeller, and a pitch and radius measuring mechanism mounted on the upper portion of said first shaft, said measuring mechanism including an adjustable member slidably mounted on the upper portion of said first shaft, an arm connected to said adjustable member and extending laterally outward therefrom, said arm being provided with dimension indicia to measure the radius of a propeller, a second upstanding shaft generally parallel to said first shaft, means for slidably and adjustably mounting said second shaft to said arm, an arcuate scale element mounted to said second shaft adjacent its lower end having indicia to determine the pitch of a propeller blade, and a rotatable indicator member adjacent the lower portion of said scale element, said indicator member having an indicating portion movable along said scale element on one end thereof and positionable adjacent the circumference of a propeller for determining the radius thereof on said dimension indicia of said arm, said indicator member further having a pair of spaced blade contacting portions opposite to said indicating portion for determining the position of said indicating portion on said scale element when said pair of spaced blade connecting portions are engaged with a propeller blade in measuring the pitch thereof.

8. In an instrument for determining the pitch of a propeller having a first upstanding shaft and adjustable means for positioning a propeller on said instrument with said first shaft passing through the bore of the propeller, the improvement comprising a pitch measuring mechanism slidably and adjustably mounted on the upper portion of said shaft, said measuring mechanism including a laterally extending arm slidable on said first upstanding shaft, a second upstanding shaft generally parallel to said first shaft, means for slidably and adjustably mounting said second shaft to said arm, an arcuate scale element mounted to said second shaft adjacent its lower end and having indicia to determine the pitch of a propeller blade, and a rotatable indicator member adjacent the lower portion of said scale element, said indicator member having an indicating portion movable along said scale element on one end thereof and a pair of spaced blade contacting portions opposite to said indicating portion for determining the position of said indicating portion on said scale element when said pair of spaced blade contacting portions are engaged with a propeller blade.

References Cited
UNITED STATES PATENTS

| | | | |
|---|---|---|---|
| 1,597,357 | 8/1926 | Godfrey | 33—174 |
| 1,696,525 | 12/1928 | Coolidge | 33—174 |
| 2,000,281 | 5/1935 | Godfrey | 33—174 |

SAMUEL S. MATTHEWS, *Primary Examiner.*